US012595131B2

(12) United States Patent
Larsen

(10) Patent No.: US 12,595,131 B2
(45) Date of Patent: Apr. 7, 2026

(54) CHAIN CONSTRUCTION

(71) Applicant: GRAM EQUIPMENT A/S, Kolding (DK)

(72) Inventor: Jan Kjær Larsen, Sdr. Stenderup (DK)

(73) Assignee: GRAM EQUIPMENT A/S, Kolding (DK)

( * ) Notice: Subject to any disclaimer, the term of this patent is extended or adjusted under 35 U.S.C. 154(b) by 476 days.

(21) Appl. No.: 18/026,260

(22) PCT Filed: Sep. 17, 2021

(86) PCT No.: PCT/DK2021/050287
§ 371 (c)(1),
(2) Date: Mar. 14, 2023

(87) PCT Pub. No.: WO2022/057992
PCT Pub. Date: Mar. 24, 2022

(65) Prior Publication Data
US 2023/0356951 A1 Nov. 9, 2023

(30) Foreign Application Priority Data

Sep. 18, 2020 (DK) .............................. PA 2020 70600

(51) Int. Cl.
*F16G 13/02* (2006.01)
*A23G 9/14* (2006.01)
(Continued)

(52) U.S. Cl.
CPC .............. *B65G 17/12* (2013.01); *A23G 9/14* (2013.01); *A23G 9/30* (2013.01); *B65G 45/22* (2013.01);
(Continued)

(58) Field of Classification Search
CPC ......... F16G 13/02; F16G 13/06; B65G 17/12; B65G 45/22; A23G 9/14; A23G 9/30
(Continued)

(56) References Cited

U.S. PATENT DOCUMENTS 593,811 A * 11/1897 McIntire ................. F16G 13/02
198/853
2,788,670 A * 4/1957 Bruestle ................. E21C 25/36
474/225
(Continued)

FOREIGN PATENT DOCUMENTS

DE    10 2008 007963 A1    8/2009
EP         1 237 804 A1    9/2002
(Continued)

OTHER PUBLICATIONS

International Search Report for PCT/DK2021/050287 mailed Jan. 5, 2022.
(Continued)

*Primary Examiner* — Douglas A Hess
(74) *Attorney, Agent, or Firm* — CANTOR COLBURN LLP

(57) ABSTRACT

A chain link is provided with a bushing construction where a chain pin is used for connecting a plurality of chain links, where the chain pin is inserted through the bushing along an axis, where the bushing in a cross section orthogonal to the axis has a circular cross section and where a resilient sleeve is arranged around the chain pin, where the chain pin has a flat face along the axis, and the resilient sleeve has a corresponding flat face in engagement with the flat face of the pin, and where the outer periphery of the resilient sleeve, when mounted on the chain pin, has a non-circular cross section, such that a free space is provided between the outer periphery of the sleeve and the inside of the bushing.

11 Claims, 4 Drawing Sheets

(51) Int. Cl.

| | |
|---|---|
| *A23G 9/30* | (2006.01) |
| *B65G 17/12* | (2006.01) |
| *B65G 45/22* | (2006.01) |
| *F16G 13/06* | (2006.01) |

(52) U.S. Cl.
CPC .......... *F16G 13/06* (2013.01); *B65G 2207/26* (2013.01)

(58) Field of Classification Search
USPC .......................................................... 198/850
See application file for complete search history.

(56) References Cited

U.S. PATENT DOCUMENTS

| | | | | |
|---|---|---|---|---|
| 3,363,745 | A | 1/1968 | Thuerman et al. | |
| 4,297,839 | A | 11/1981 | Gurney | |
| 6,305,530 | B1 * | 10/2001 | Guldenfels | B65G 17/08 |
| | | | | 198/853 |
| 6,564,933 | B2 * | 5/2003 | Morimoto | B65G 17/08 |
| | | | | 198/853 |
| 8,540,597 | B2 * | 9/2013 | Wang | F16G 13/06 |
| | | | | 403/118 |
| 10,384,875 | B2 * | 8/2019 | Menke | B65G 17/086 |
| 2009/0250316 | A1 | 10/2009 | Gaetano | |

FOREIGN PATENT DOCUMENTS

| | | | | | |
|---|---|---|---|---|---|
| EP | 1550819 | A1 * | 7/2005 | ............. | F16G 13/02 |
| EP | 2136103 | A2 | 12/2009 | | |
| FR | 2 700 758 | A1 | 7/1994 | | |
| JP | S51132786 | U | 10/1976 | | |
| JP | H09257104 | A | 9/1997 | | |
| KR | 20110002256 | A | 1/2011 | | |
| WO | 01/38206 | A1 | 5/2001 | | |
| WO | WO-2015115392 | A1 * | 8/2015 | ............. | F16G 13/06 |
| WO | WO-2022057992 | A1 * | 3/2022 | ............... | A23G 9/16 |

OTHER PUBLICATIONS

Written Opinion for PCT/DK2021/050287 mailed Jan. 5, 2022.
Danish Search Report for Application No. PA 2020 70600, dated Feb. 9, 2021.

* cited by examiner

CHAIN CONSTRUCTION

CROSS-REFERENCE TO RELATED APPLICATIONS

This application claims priority to PCT Application No. PCT/DK2021/050287, having a filing date of Sep. 17, 2021, which is based DK Application No. PA 2020 70600, having a filing date of Sep. 18, 2020, the entire contents both of which are hereby incorporated by reference.

FIELD OF TECHNOLOGY

The following is directed to a chain construction with a particular bushing construction as well as a chain assembled from a plurality of such chain links. Furthermore, the following is directed to use of such a chain link particularly in an environment where the chain will be exposed to fluids and potential freezing resulting in ice formation.

BACKGROUND

Such chains are usually implemented in connection with conveyor systems where it is desirable to transport objects along a transport path. For this reason, the chains or conveyor belts shall engage some type of drive means in order to propel the chain or conveyor belt. Furthermore, such chains shall be flexible in the same manner as for example bicycle chains.

Particularly in the environments where the embodiments of the present invention are intended to operate it is furthermore a requirement that ice or debris does not hamper the chain's ability to flex or bend and therefore in the conventional art various attempts have been made in order to avoid the particular build-up of ice in the chain construction.

An example is described in U.S. Pat. No. 4,297,839. The chain described in this patent has the primary function of linking a row of wheels used for conveying the conveyor units.

A further example is known from the same applicant's patent WO01/38206 wherein a chain construction including bushings was proposed. The bushings were provided with apertures. The apertures were provided in order to drain away any fluids which could otherwise cause ice formation in the connection between adjacent chain links, particularly between the chain pin and the bushing. This construction has however some drawbacks.

In the conventional art the types of chains as disclosed in WO 01/38206 are typically used in freezing tunnels for making ice cream products. The chains carry trays on which the ice cream products are placed. The freezing tunnel typically encloses maybe 2-500 m of chain (and trays) and a small length of chain at a time is outside the freezing tunnel. For practical purposes the chain typically travels on an upward and a downward spiral conveyor in order to accommodate as much chain as possible inside an as small as possible housing. This requires the chain to be able to flex, both sideways but also vertically as it enters, leaves and travel along the spiral freezing construction. This flexibility allows or requires play between the parts of the chain, such as bushings, pins and fishplates. This play provides space where liquid/water may accumulate. The conventional art chain disclosed in WO 01/38206 is provided with an aperture in the sidewall of the bushing in order for water to allow to be drained out, such that the chains flexibility is retained. This aperture may be clogged up by debris or other matter and thereby hampering the drainage of water from the space created in order to allow play in the chain. This is even more so when the temperature in the freezing tunnel is typically −40° C., and as such most liquids will be deep frozen, and therefore not be able to drain through the apertures. Although the chain for very short periods of time travels outside the freezer (in order to allow loading and unloading of ice cream products) the ice does not thaw allowing for drainage.

In the conventional art it has also been attempted to provide a lubricant, filling out the spaces around the connection pins such that fluids deriving from the production and/or conveying of objects by the conveyor chain could be avoided. The lubricant has filled up the space and the chain and lubricant has remained flexible during operation. However, the lubricants have a tendency to harden over time or to leak out and pollute the immediate environment and as such it is undesirable to have foreign substances particularly when chains are used in food production.

Although some of these constructions to a certain extend has mitigated the problems, there is still a need for a simple construction with a higher degree of certainty that the flexibility of the chain is not hampered.

SUMMARY

An aspect relates to a chain as well as a chain link construction which overcomes the drawbacks of the conventional art and provides further advantages. Particularly improved hygienic characteristics, without influencing the flexibility and physical characteristics of the chain construction.

Embodiments of the present invention address this by providing a chain construction comprising a plurality of chain links, where the separate chain links are coupled together in the chain construction by pairs of fishplates, where the fish plates are provided with apertures in either end, and where the chain links has a bushing construction in either end such that a chain pin is used for connecting a plurality of chain links via the fish plates, where the chain pin is inserted through the bushing along an axis, such that play between the fishplates and the chain links is provided, where the bushing in a cross section orthogonal to the axis has a circular cross section, and where the bushing has an unbroken sidewall, and where a resilient sleeve is arranged around the chain pin, where the chain pin has a flat face along the axis, and the resilient sleeve has a corresponding flat face in engagement with the flat face of the pin, and where the outer periphery of the resilient sleeve, when mounted on the chain pin, has a non-circular cross section, such that a free space is provided between the outer periphery of the sleeve and the inside of the bushing.

The free space first of all minimizes the risk of any liquid being accumulated in the chain construction in that it is able to freely flow and drain from the chain. Contrary to the conventional art constructions, the drainage is not limited to a drain aperture—see discussion above. In the present construction the play between the fish plates and the chain link (particularly the open ends of the bushings), provides a larger drain opening. Furthermore, due to the relative movement of adjacent chain links and the free space surrounding the chain pin water can easily drain out through the space provided by the play. Furthermore, as these types of chains are used in freezing tunnels the water which enters the free space will typically be ice. Due to the relative movement of adjacent chain links allowed by the play and the free space, the ice will continuously be crushed, and the opening between the fish plates and the ends of the bushings will allow the crushed ice to escape the free space. With the conventional art construction, the drain opening could easily clog up or be filled by ice, whereby liquid and/or ice had no escaping. If the chain construction loses (even part of) its flexibility, the chain constructions travel through the freezer will be severely hampered and may cause the production to be stopped until the chain has been cleaned and/or thawed.

Typically, the thawing process of these types of chains used in ice cream manufacturing freezing tunnels may take 8-10 hours. During this time no production can take place. As most of the chain (at least 90-95%) is housed inside the freezing installation at –40° C. and the chain only leaves the freezing tunnel in order for the trays carried by the chain to be loaded and unloaded (maybe at 20° C.) the chain never thaws properly, and production stops are necessary in order to remove ice and other debris, such that the chain may travel through the tunnel unimpeded.

When the chain link is incorporated in a chain construction and activated, the chain links will move relative to each other whereby the chain pin will move in the oversize aperture provided in the bushing. In this manner the chain pin will effectively work any debris or liquid out of the space between the chain link pin and the bushing. In this manner an active removal of matter from the bushing is provided. At the same time the non-circular shape of the chain pin ensures that the contact between the bushing and the chain pin may be controlled such that only slack in the chain is provided in one direction. Thereby the chain may be operated very precisely and at the same time be provided with slack allowing movement in the bushing in order to achieve the draining/cleaning properties as discussed above.

The advantage of a chain is that it is very stiff, but at the same time may bend. The bending is provided by the pins connecting adjacent chain links in a hinge-like manner. The chain is therefore able to flex in a two-dimensional plane (XY plane). Embodiments of the present invention provide a further flexibility as compared to normal chains. The free space in the bushing allows the pin to move off-axis, providing the possibility for the chain to flex in a direction orthogonal to the XY-plane. This aspect is important in that these types of chains may be used with chain guides, and the extra flexibility allows the chain to adjust/compensate for imprecision in the positioning of chain drive wheels. Also in some applications the chain drive wheels are arranged at an angle to the path of the chain, and particularly in such applications the ability to flex in a direction orthogonal to the XY plane provides for better engagement with the drive wheels, and thereby a more stable transfer of driving power, and smooth running of the chain. Therefore the proper operation of a chain construction in such an installation, requires that the chain remains flexible and as discussed above free from ice around the moving parts.

In a further embodiment of the invention the outer periphery of the cross-section orthogonal to the axis of the resilient sleeve when mounted on the chain pin describes two circle arches, where each arch is less than a half circle.

In this manner it is ensured that the resilient sleeve does not fill up the entire circular cross-section of the bushing and at the same time by taking up the slack in the bushing between the circular periphery of the bushing and the outer surface of the sleeve a good contact and load transfer surface is provided between the chain pin and the bushing.

The ability to move by the chain pin in the bushing in the free space between the bushing and the resilient sleeve allows any ice built-up to be broken down and due to the movement of the different parts of the chain to be shaken loose and thereby able to leave the space between the bushing and the resilient sleeve. In this manner the movement of the resilient sleeve inside the bushing will provide a constant cleaning as long as the chain is being operated.

In a still further embodiment of the invention each of the circle arches has a radius corresponding to the radius of the inside of the bushing.

This particular embodiment further reinforces the previous embodiment in that the contact between the bushing and the resilient sleeve is even more pronounced leading to a stable force transfer and at the same time eliminates any undesired movement in the chain when there is tension in the chain.

It is also foreseen in an embodiment that the resilient sleeve is not cylindrical along the axis, the sleeve having two free ends where between the sleeve material is disposed, and where the material thickness in either free end of the sleeve is thinner than the material thickness in a central part of the sleeve.

The resiliency will cause the sleeve to be deformed when subjected to load. However when providing different thicknesses, such that the sleeve for example in a cross-section parallel to the axis has a triangular cross-section with the apex substantially in the middle of the sleeve, it is achieved that the free space is made even larger, and as such better can allow foreign matter, ice, liquid and the like to be evacuated. During load—if the chain construction is travelling in a straight line, the apex will be deformed distributing the load to a larger part of the sleeve. If the chain construction is travelling through a curve—for example through the spiral freezer, one of the tapering sides of the sleeve (i.e., from the apex towards a free end of the sleeve) may be substantially in full contact with the bushing and pin and as such provide a stable contact surface—stabilizing the chains constructions travel.

The sleeve thickness may be selected between 0.1 and 4 mm, and a shore D hardness of between 65 and 95. With these hardness's the sleeve may appear rather stiff, but in use it will exhibit characteristics as discussed above. The materials may be polymers such as POM, Nylon, Dekin®, PE, PVC etc.

In a still further embodiment of the invention, the resilient sleeve can move relative to the bushing between 0.1 and 2 mm, or 0.15 mm to 1.5 mm, without depressing the resilient sleeve.

These movements require that the bushing and the radius of the resilient sleeve have a mutual dimensioning such that the open space between the resilient sleeve and the bushing is achieved. With these measurements it is ensured that there is enough free space to allow ice and other debris to escape the free space between the resilient sleeve and the bushing.

In a still further embodiment of the invention, the chain construction is, as recited above assembled from a plurality of primary chain links and secondary chain links and optionally further types of chain links, where the first type of chain links comprises two parallel fishplates, each defining an xy-plane, where the fishplates are maintained at a fixed distance relative to each other by the provision of two pipe sections each pipe section having two open ends thereby defining bushings, where at least one open end is fastened to the periphery of apertures provided in one of the two fish plates;

the secondary type of chain links comprises two parallel secondary fish plates arranged at a mutual distance, such that the secondary fish plates may overlap the first type of chain link, and where the secondary fish plates are provided with apertures in either end, such that the apertures in the secondary fish plates may overlap the bushings in the first type of chain link;

chain pins, each suitable to be inserted through overlapping apertures of the first type of chain links and through the bushing of secondary type of chain links, thereby hingely connecting the first type of chain links and the secondary type of chain links, where a resilient sleeve is arranged around the chain pin, where the chain pin has a flat face along the longitudinal axis of the chain pin, and the resilient sleeve has a corresponding flat face in engagement with the flat face of the pin, and where the outer periphery of the resilient sleeve when mounted on the chain pin has a non-circular cross section, such that a free space is provided between the outer periphery of the sleeve and the inside of the bushing.

When only one of the (secondary) fishplates is fastened to one end of the bushing the other fish plate may be removed from the other end of the bushing. For certain types of chain constructions according to embodiments of the invention rollers are arranged for rotation using the bushing as an axle. The rollers are used to guide the chain construction along the desired path—for example in a freezing tunnel as described above. This implies that the rollers are exposed to wear and tear. By not fastening the fish plates in both ends of the bushing it is possible to remove and replace the rollers on the bushings, and thereby renovate the chain construction providing longer service life. Therefore embodiments of the invention also provide an embodiment wherein the chain link comprises two secondary fish plates with apertures in either end, and where a bushing having an outer periphery is fastened inside the aperture of one secondary fish plate and in the other end of the bushing has an outer periphery either larger or smaller than the aperture in the secondary fishplate, and where the chain pin may be passed through a central bore in the bushing, and where the chain pin in one end may be fixed to the primary fish plate, and in the other end be provided with means for removably maintaining the chain pin relative to the bushing. For this purpose the chain pin may be provided with a thread in a free distal end of the pin and nut and optionally a washer, such that it may be removably fastened to another primary fishplate. Alternatively, a locking ring, a crimp washer or other reliable removable fastening means may be provided.

Embodiments of the invention are further directed to an ice cream production facility comprising a freezing installation wherein a chain construction according to claim 8 is provided, wherein a washing station is provided for washing trays carried by the chain construction and where the chain construction with the trays passes through the washing station, and where at least a water pressure cleaning device and an air blowing drying device is installed in the washing station for cleaning the trays and the chain construction.

The washing station is not provided in order to clean the chain construction as such, but is mainly provided for cleaning the trays mounted/carried by the chain, as the trays are where the products to be frozen are carried/arranged throughout the installation. In order not to have cross-contamination between different products being frozen in the installation, the trays are typically cleaned at regular intervals and/or when switching to another product/flavor to be frozen. As the trays are being carried/propelled by the chain construction also the chain construction passes through the washing station.

Due to the chains' particular construction, in particular the provision of play in the bushing/fishplate construction, the cleaning may be very thorough and also the drying provided by the air blowing very effective. Thereby—due to the open construction of the chain construction, it is both possible to clean the construction and drying it such that the cleaning process does not cause build-up of ice as the chains' construction travels through the freezer. The cleaning may be aided by using hot water, thereby thawing any ice or the like caught in the chain construction.

This ice cream production facility including a washing station allows for continuous production as the trays and chain construction are cleaned as the continuously travels along the production path. During the passage of the washing station trays and chain construction are dried again, such that as the chain construction enters the freezing installation again, the moisture/water retained in the chain construction will be minimal, and due to the movement of the chain pin in the oversized bushing, together with the play provided allowing crushed ice to leave the chain construction, the chain construction maintains it flexibility. The use of the washing station may delay the production by ½-1 hour, in which time the freezing tunnel does not have to be thawed, which is otherwise the norm in this kind of facility. The traditional thawing and re-freezing typically have a duration of 8-10 hours. Consequently, the washing station in combination with the inventive chain construction also for these reasons provides added advantages over the conventional art.

Embodiments of the invention are also directed to a method of operating an ice cream production facility, where the ice cream production facility comprise a chain construction, where the chain construction carries trays with products to be frozen through a freezing tunnel, and where the washing station is arranged outside the tunnel, such that the chain construction including trays travels through the washing station, where the washing station may be activated in order to clean trays and the chain construction, without stopping the chain construction and while the freezing environment inside the freezing tunnel is maintained.

In a further embodiment, the ice cream production facility may be operated in at least two modes:

a first mode where the temperature in the freezing tunnel is maintained between −20-−50° C., and where the chain construction carrying trays filled with products to be frozen continuously travels through the freezing tunnel;

a second mode where the trays are empty before being transported through the washing station, and where a washing cycle comprising flushing the trays and chain construction with a liquid followed by an air-drying step is carried out while the chain construction and trays travels through the ice cream production facility, and the freezing tunnel maintains its temperature between −20-−50° C.

The chain construction allows for the thorough cleaning and particularly drying, such that it is not necessary to shut the freezing tunnel down or allow it to thaw. In this manner cleaning cycles may be carried out very quickly—approx. 0.5 to 1 hours as compared to other cleaning processes not utilizing the inventive chain construction in combination with the tray/chain washing station, which typically necessitates a shutdown period (downtime) of 8-10 hours.

It is clear from the discussion above that a chain assembled from the novel and inventive chain links incorporating the bushing construction as discussed above will also enjoy the same advantages.

BRIEF DESCRIPTION

Some of the embodiments will be described in detail, with references to the following Figures, wherein like designations denote like members, wherein.

DETAILED DESCRIPTION

Figure 1:
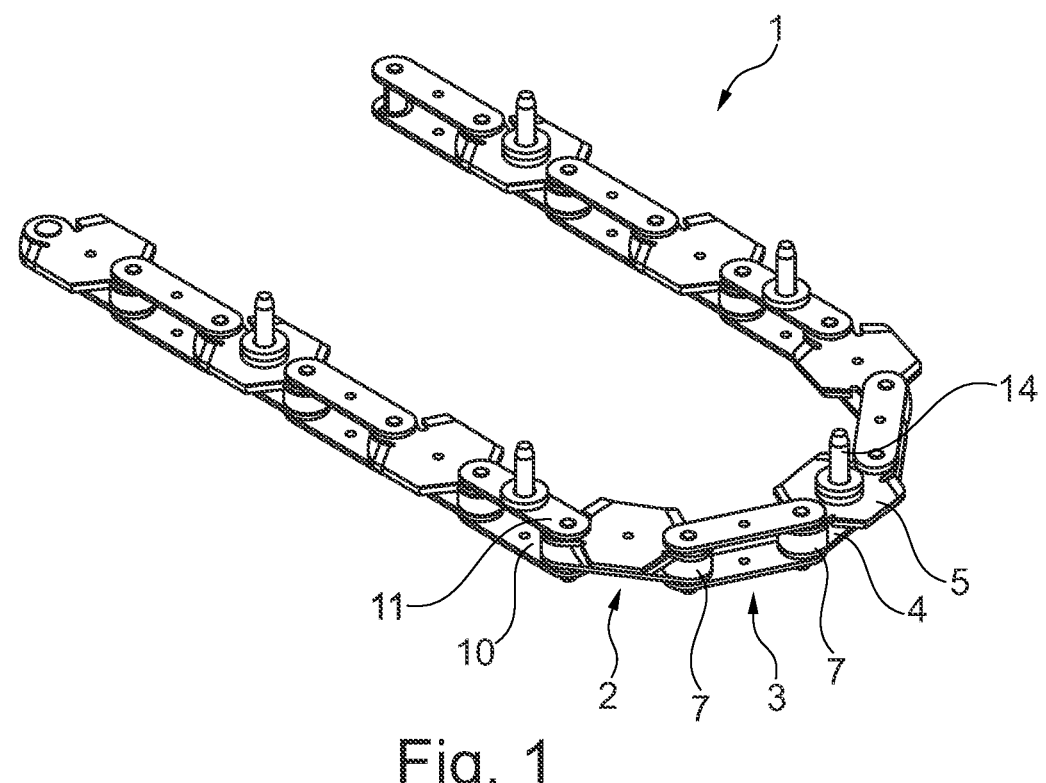
FIG. 1 illustrates a chain assembled from a plurality of chain links comprising bushing constructions according to embodiments of the invention.

In FIG. 1 is illustrated a segment of a chain 1 assembled from a number of chain links 2, 3. The chain links 2 comprise two parallel fishplates 4, 5 (better illustrated in FIG. 2) which are maintained in a fixed distance relative to each other by the provision of two pipe sections 6 (see FIG. 2). In the embodiment illustrated in FIGS. 1 and 2 a further roller 7 is provided around the pipe section 6. The roller will help guide the chain along its conveying path with a minimum of friction.

The other type of chain link 3 comprises two parallel secondary fishplates 10, 11. Both the first fishplates 4, 5 and the secondary fishplates 10, 11 are provided with apertures, where the apertures in the first type of chain link are provided by the pipe section 6 and corresponding apertures are provided in the secondary fish plates 10, 11 such that it is possible to overlap the apertures in the first type of chain link with the apertures in the fishplates of the second type of chain link. Once these apertures overlap, a chain pin 20 is inserted through the overlapping apertures of the first and secondary type of chain links 2, 3 whereby these are hingedly connected.

On at least some of the fishplates 5, are arranged spigots 14. These spigots 15 serve to engage trays (see FIG. 5) positioned on the chain construction 1, travelling through the freezing facility.

The pipe section 6 functions as a bushing such that the chain pin 20 is inserted inside the bushing 6. Surrounding the chain pin is a resilient sleeve 22. In order to ensure that the resilient sleeve does not rotate relative to the chain pin 20 the chain pin is provided with a flat surface 24, see FIG. 3. The resilient sleeve 22 has a corresponding flat surface such that when the sleeve 22 is fitted over the chain pin 20 the resilient sleeve will not rotate relative to the chain pin 20.

Figure 2:
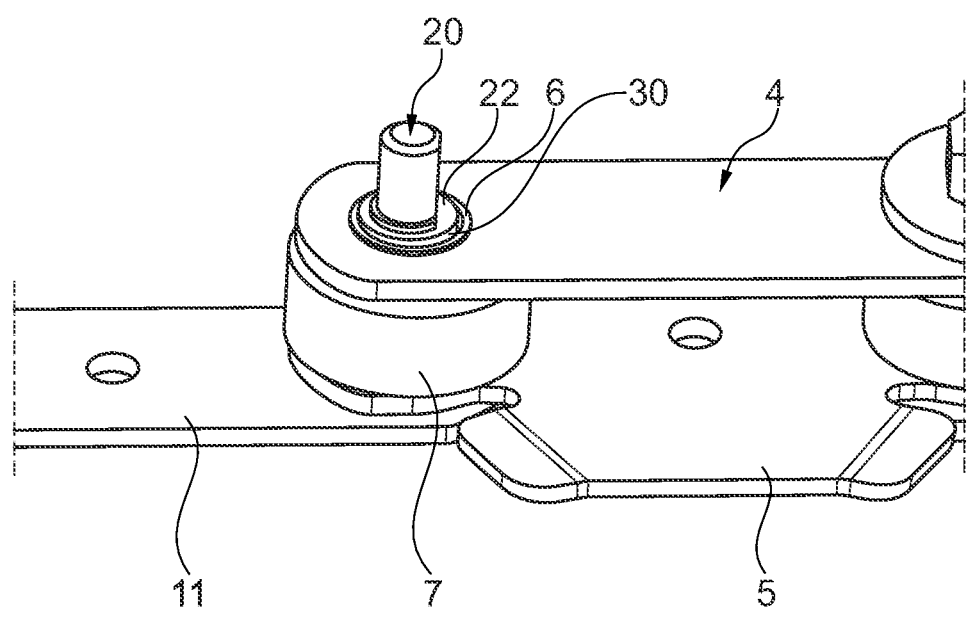
FIG. 2 illustrates a close-up of a bushing where a fishplate has been removed.

As is evident from FIG. 2, the resilient sleeve 22 does not fill up the entire opening of the bushing 6 such that a free space 30 is made available. This free space 30 is very important for embodiments of the invention in that as the chain moves the two types of chain links 2, 3 will move relative to each other, both in the horizontal plane and in a vertical plane whereby the chain pin 20 will be able to perform an oscillatory movement such that any debris or moisture caught in a free space 30 will be able to be removed. Particularly where the chain construction according to embodiments of the present invention is used in cold environments there might be a tendency for liquid to freeze and build up in the bushing construction. In some embodiments, the resilient sleeve may be tapered such that the resilient sleeve adjacent one end of the chain pin has a larger circumference than in the other. This taper will further reinforce the ability of the construction to empty the hinge joint between adjacent chain links from ice and other debris.

Due to the ability of the chain pin 20 to move relative to the bushing 6 the ice formation may be hindered and crushed such that the ice particles will be able to fall out of the chain construction.

In order to further facilitate this and still maintain a chain with a very rigid structure which is also stable and relatively silent during operation the outer surface/periphery 26 is shaped as part of a circle arch where the arch spans less than 180°. As the bushing has a cross section substantially circular the part arches of the resilient sleeve 22 will facilitate that the resilient sleeve does not fill up the entire space provided by the bushing 6 but leaves the open space 30.

Figure 3:
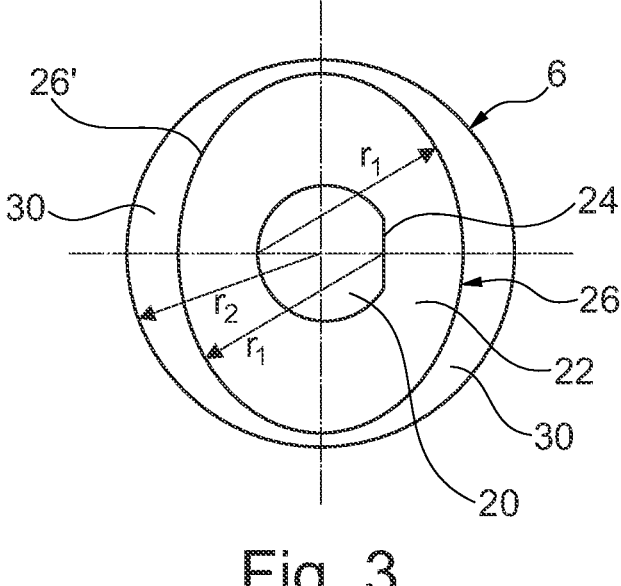
FIG. 3 illustrates a detail of the chain.

In the embodiment illustrated in FIG. 3, the two arched sections 26, 26' of the resilient sleeve's outer surface is provided with a radius of $r_1$ where the centre for each arch is displaced from the centre of the bushing. The bushing on the other hand is provided with a different radius, namely in this embodiment the radius of $r_2$.

Consequently, the resilient sleeve and the chain pin 20, 22 will be able to perform a translatory movement inside the bushing 6 such that the free space 30 may be closed in either side depending on the travelling direction of the chain. At the same time any unevenness in the chain's path will cause a wobbling of the chain whereby the resilient sleeve again will move inside the bushing crushing and moving the debris stuck in the open space 30 out of the opening.

Figure 4:
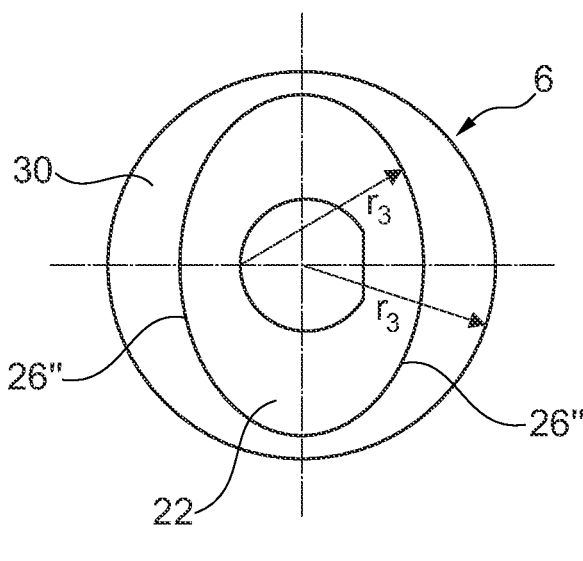
FIG. 4 illustrates a schematic cross-section through a bushing construction.

In FIG. 4 is schematically illustrated a further embodiment where the outer surfaces 26" of the resilient sleeve 22 are designed with the same radius $r_3$ as the radius of the bushing 6. As the outer surfaces 26" only describes part of an arch which is less than 180° the resilient sleeve will provide a space 30 between the resilient sleeve 22 and the bushing 6. On the other hand, as the radiuses are the same for both the resilient sleeve and the bushing a very tight fit is facilitated between the outer periphery 26" of the resilient sleeve and the inner surface of the bushing 6 such that loads may be safely transferred by the chain.

Figure 5:
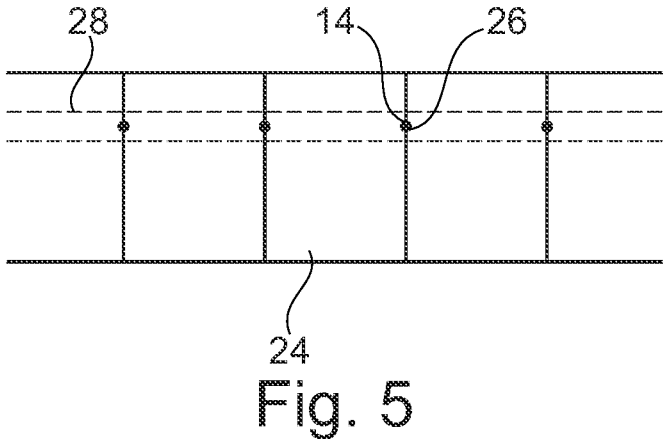
FIG. 5 illustrates a chain and trays.

In FIG. 5 is schematically illustrated a chain construction as illustrated in FIG. 1 whereupon a number of trays are mounted. The trays are seen from above. The trays 24 are provided with an indentation or aperture 26. Under the trays 24 in dashed lines 28 is indicated the chain construction 1. As is evident from FIG. 1, not all fish plates 5 are provided with spigots 14. The distance between adjacent spigots 14 corresponds to the width of a tray 24, such that the spigots 14 are engaging the trays 24 in their indentations or apertures 26. As the chain construction 1 moves, the trays 24 are propelled along the travelling direction.

Figure 6:
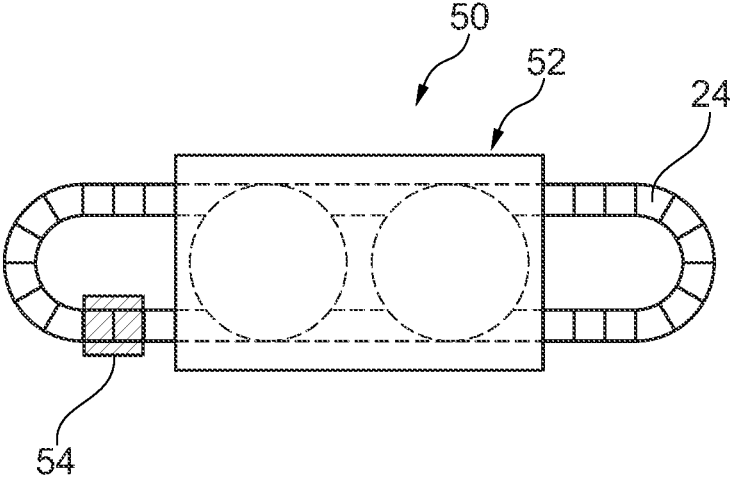
FIG. 6 illustrates the principles in an ice cream production facility.

Turning to FIG. 6 a schematic overview of an example of the freezing installation provided in connection with an ice cream manufacturing line is illustrated. It shall be emphasized that FIG. 6 is very schematic and shall only be construed as illustrating a principle. The freezing installation 50, includes a chain construction 1 with a plurality of trays 24 as described with reference to FIGS. 1 and 5. As the chain construction 1 is activated the trays will follow the indicated path and enter a freezing tunnel 52. Inside the freezing tunnel the chain construction and trays are made to travel a considerable distance for example by using spiral towers arranged inside the freezing tunnel. These are per se known in the conventional art. The chain construction may be 2-800 m long with only very few meters extending outside the tunnel 52.

Once the trays leave the tunnel, frozen product may be removed from the trays and new products to be frozen may be added, before the trays again enters the tunnel. For this purpose, the chain construction and trays only need to be outside the freezing tunnel for a short period of time. Although FIG. 6 illustrates that the chain construction and trays are outside the freezing installation 50 in opposite ends, it is clear that the chain construction and trays 24 need only travel outside the freezing installation in one end.

As indicated, a washing station 54 is arranged, such that the chain construction 1 and the trays 24 travels through the washing station 54.

When a production of the same type of products is taking place, it is not necessary to activate the washing station. However, when it is desirable to handle another different type of product it may be desired to clean the chain construction and the trays 24, in order to avoid cross contamination. In such situations the washing station may be activated and carry out a washing and drying routine. Typically, the trays 24 and the chain construction are exposed to a pressure wash by a suitable liquid (water and optionally a washing compound), followed by a drying step in the shape of pressurized air directed at the chain construction and the trays. Hereby the chain construction and the trays may very quickly—duration ½-1 hour, be cleaned. Traditionally the cleaning of trays and chain construction necessitates that the entire freezing installation be thawed, cleaned and once again brought down to the desired freezing temperature, which may take 8-10 hours.

It is important that the chain construction is either completely dry or at least dry to such an extent that any ice forming in the chain construction may be crushed and removed during operation.

Otherwise, the chain construction will freeze and cause the entire installation to jam, thereby halting production.

Figure 7:
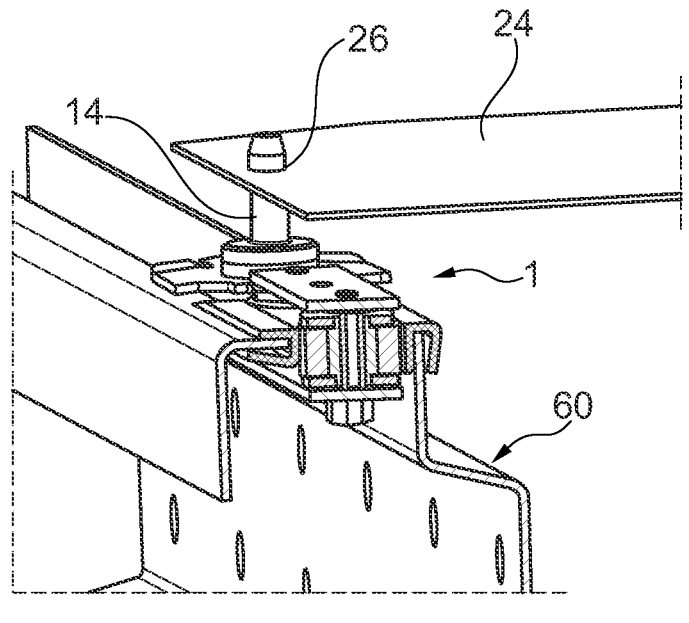
FIG. 7 illustrates a cross section through part of a chain construction carrying a tray.

In FIG. 7 is illustrated a cross-section through an embodiment. A chain construction (1) according to embodiments of the invention is traveling guided by a guiderail construction 60. The chain construction 1 comprises a spigot 14, which spigot 14 has engaged a tray 24, by the spigot 14 being fitted through an aperture 26 in the tray 24. As the chain construction travels along the guiderail construction 60 the tray 24 will likewise be guided along the guiderail.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A chain construction for a freezing installation of an ice cream production facility, the chain construction comprising:
  a plurality of chain links, where the separate chain links are coupled together in the chain construction by pairs of primary fishplates, where the primary fish plates are provided with apertures in either end;
  a bushing construction including bushings disposed in the apertures at either end of the primary fishplates;

a chain pin for connecting adjacent chain links via the primary fish plates, where the chain pin is inserted through the bushing along an axis, such that play between the fishplates and the chain links is provided, where the bushing construction in a cross section orthogonal to the axis has a circular cross section; and
  a resilient sleeve arranged around the chain pin, where the chain pin has a flat face along the axis, and the resilient sleeve has a corresponding flat face in engagement with the flat face of the pin, and where an outer periphery of the resilient sleeve, when mounted on the chain pin, has a non-circular cross section, such that a free space is provided between the outer periphery of the resilient sleeve and an inside of the bushing;
  wherein the resilient sleeve is made from a polymer material having a Shore D hardness between 65 and 95;
  wherein a relative movement of adjacent chain links, allowed by the play and the free space, provides that ice formed in the free space is crushed between the resilient sleeve and the bushing.

2. The chain construction according to claim 1, wherein the outer periphery of the cross-section of the bushing orthogonal to the axis of the resilient sleeve when mounted on the chain pin describes two circle arches, where each arch is less than a half circle.

3. The chain construction according to claim 2, wherein each of the circle arches has a radius corresponding to the radius of the inside of the bushing.

4. The chain construction according to claim 1, wherein the resilient sleeve is not cylindrical along the axis, said the sleeve having two free ends where between the resilient sleeve material is disposed, and where the material thickness in either free end of the resilient sleeve is thinner than the material thickness in a central part of the resilient sleeve.

5. The chain construction according to claim 1, wherein the resilient sleeve can move relative to the bushing between 0.1 and 2 mm, without depressing the resilient sleeve.

6. The chain construction according to claim 1, wherein the chain link comprises two secondary fish plates with apertures in either end, and where a bushing having an outer periphery is fastened inside the aperture of one secondary fish plate and in the other end of the bushing has an outer periphery either larger or smaller than the aperture in the secondary fishplate, and where the chain pin may be passed through a central bore in the bushing, and where the chain pin in one end may be fixed to the primary fish plate, and in the other end be provided with means for removably maintaining the chain pin relative to the bushing.

7. The chain construction according to claim 1, assembled from a plurality of primary chain links and secondary chain links and optionally further types of chain links, where:
  the primary chain links comprises two parallel fishplates, each defining an xy-plane, where the fishplates are maintained at a fixed distance relative to each other by the provision of two pipe sections each pipe section having two open ends thereby defining bushings, where at least one open end is fastened to the periphery of apertures provided in one of the two fish plates;
  the secondary type-of-chain links comprises two parallel secondary fish plates arranged at a mutual distance, such that the secondary fish plates may overlap the primary chain link, and where the secondary fish plates are provided with apertures in either end, such that the apertures in the secondary fish plates may overlap the bushings in the first type of chain link; and
  chain pins, each suitable to be inserted through overlapping apertures of the primary chain links and through the bushing of secondary chain links, thereby hingely connecting the primary chain links and the secondary chain links, where a resilient sleeve is arranged around the chain pin, where the chain pin has a flat face along the longitudinal axis of the chain pin, and the resilient sleeve has a corresponding flat face in engagement with the flat face of the pin, and where the outer periphery of the resilient sleeve when mounted on the chain pin has a non-circular cross section, such that a free space is provided between the outer periphery of the resilient sleeve and the inside of the bushing.

8. An ice cream production facility comprising a freezing installation wherein a chain construction according to claim 7 is provided, wherein a washing station is provided where the chain construction passes through the washing station, and where at least a water pressure cleaning device and an air blowing drying device is installed in the washing station for cleaning the chain construction.

9. A method of operating an ice cream production facility according to claim 8, where the ice cream production facility comprise a chain construction, where the chain construction carries trays with products to be frozen through a freezing tunnel, and where the washing station is arranged outside the tunnel, such that the chain construction including trays travels through the washing station, where the washing station may be activated in order to clean trays and the chain construction, without stopping the chain construction and while the freezing environment inside the freezing tunnel is maintained.

10. The method according to claim 9 wherein the ice cream production facility at least operates in two modes:

a first mode where the temperature in the freezing tunnel is maintained between −20 and −50° C., and where the chain construction carrying trays filled with products to be frozen continuously travels through the freezing tunnel;

a second mode where the trays are empty before being transported through the washing station, and where a washing cycle comprising flushing the trays and chain construction with a liquid followed by an & «step is carried out while the chain construction and trays travels through the ice cream production facility, and the freezing tunnel maintains its temperature between −20 and −50° C.

11. The chain construction according to claim 1, wherein the resilient sleeve can move relative to the bushing is 0.15 mm to 1.5 mm, without depressing the resilient sleeve.

\* \* \* \* \*